(12) United States Patent
Toyomura

(10) Patent No.: US 6,207,896 B1
(45) Date of Patent: Mar. 27, 2001

(54) ADHESION STRUCTURE OF BOX MEMBER

(75) Inventor: Fumitaka Toyomura, Kyotanabe (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/081,084

(22) Filed: May 19, 1998

(30) Foreign Application Priority Data

May 28, 1997 (JP) .................................................. 9-138030

(51) Int. Cl.$^7$ .................................................. H01H 13/04
(52) U.S. Cl. .................................................. 174/58
(58) Field of Search .................. 174/58; 248/205 A

(56) References Cited

U.S. PATENT DOCUMENTS

| | | | |
|---|---|---|---|
| 3,029,303 | * | 4/1962 | Severino .................. 174/97 |
| 3,499,102 | * | 3/1970 | Gillemot et al. .................. 248/205 A |
| 3,616,096 | * | 10/1971 | Roeder .......................... 248/205 A X |
| 3,726,710 | * | 4/1973 | Berger et al. ...................... 117/93.31 |
| 5,578,319 | * | 11/1996 | Noel ...................... 424/448 |
| 5,578,365 | * | 11/1996 | Kume et al. .......................... 428/195 |
| 5,593,750 | * | 1/1997 | Rothrum et al. ..................... 428/40.1 |
| 5,597,648 | * | 1/1997 | Hanneman et al. ................. 428/40.7 |

* cited by examiner

Primary Examiner—Dean A. Reichard
(74) Attorney, Agent, or Firm—Fitzpatrick, Cella, Harper & Scinto

(57) ABSTRACT

In the adhesion structure of a box member according to the present invention, the box member adheres to a adhesion surface with an adhesive member, a corner between a bottom surface and a side surface of the box member has a curved portion of a curved shape such that the adhesive member remains between the adhesion surface and the curved portion, thereby providing an adhesion structure of the box member that can readily achieve a larger adhesive strength in a smaller space.

16 Claims, 4 Drawing Sheets

ADHESION STRUCTURE OF BOX MEMBER

BACKGROUND OF THE INVENTION

1. Field of the Invention

The present invention relates to an adhesion structure for adhesion of a box member to a plane, more particularly to an adhesion structure for adhesion of a terminal box to a solar cell module.

2. Related Background Art

There are conventionally known solar cell modules formed by sealing a solar cell element with a resin on a reinforcing plate such as a steel plate or a glass plate and covering them with a protective film. Output terminals of the solar cell module are of a screwing type, a lead wire type, or a socket type and in either case terminal boxes having waterproof structure are often provided for insulation.

The terminal boxes normally adhere to the back surface of the solar cell module with such an adhesive as a silicone sealant. When the terminal boxes simply adhered to the solar cell module, the adhesive flowed out from the edge of the terminal box during adhesion. When the terminal box adhered in this way suffered peeling force in a vertical direction to the solar cell module, there arose the problem that peeling occurred at the interface between the terminal box and the adhesive.

In general, as to an adhesive strength between the adhesive and the terminal box, it is known that a shear adhesion strength is greater than an adhesion strength in the peeling direction. Adhesion between the terminal box for the solar cell module and the adhesive should desirably be so strong as to endure before cohesive failure of the adhesive, without peeling at the interface between the adhesive and the terminal box.

For solving the above problem, the adhesive strength of the terminal box was conventionally increased by pushing the terminal box applied with the adhesive against the solar cell module and thereafter leveling the adhesive by finger or by spatula to attach the adhesive to the side surfaces of the terminal box, or applying an additional adhesive to the edge of the adhered portion between the terminal box and the solar cell module, or performing a similar procedure.

These procedures, however, take a lot of time and labor and have the problem that when the terminal box adhered suffers a peeling force in a vertical direction to the solar cell module, peeling occurs at the interface between the terminal box and the adhesive, except for the adhesive portions adhering to the side surfaces.

In the case where the terminal box is attached to the solar cell module, a lager adhesive strength is sometimes required in a limited space.

SUMMARY OF THE INVENTION

The present invention has solved the above problem and provides a solar cell module comprising a terminal box that can readily achieve greater adhesive strength in a smaller space.

Namely, the present invention provides an adhesion structure of a box member when the box member adheres to an adhesion surface (hereinafter, the term "adhesion surface" means the surface of an object to which the box member adheres with an adhesive member) with an adhesion, wherein a corner between a bottom surface and a side surface of the box member has a curved portion of a curved shape such that the adhesive member remains between the adhesion surface and the curved portion. The present invention also provides an adhesion structure of a box member when the box member adheres to an adhesion surface with an adhesive member, wherein a bottom surface of the box member has a brim-like shape projected from an external surface of a side surface of the box member, and wherein an edge of the bottom surface has a curved portion of a curved shape such that the adhesive member remains between the adhesion surface and the curved portion.

DESCRIPTION OF THE PREFERRED EMBODIMENTS

Figure 1:
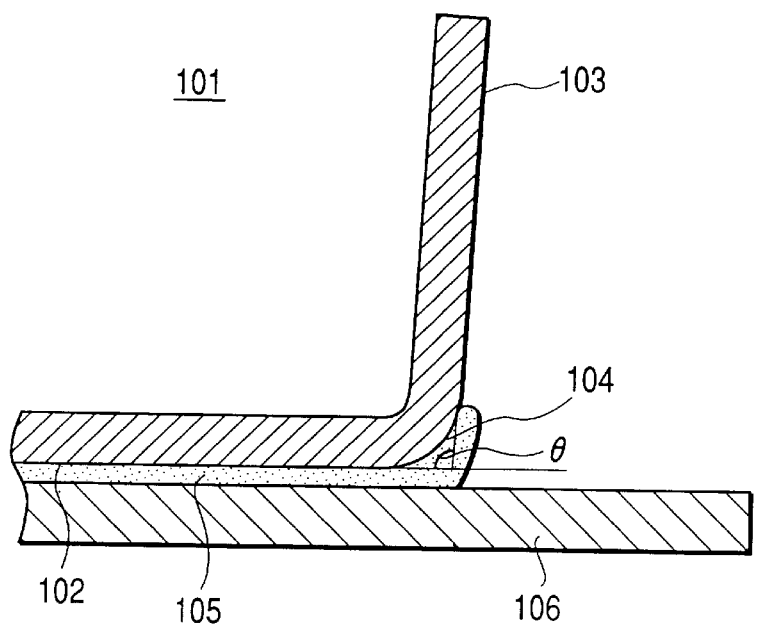
FIG. 1 is a cross-sectional view for showing an example of the adhesion structure according to the present invention.

In FIG. 1, reference numeral 101 designates a box member, e.g. a terminal box, which adheres to an adhesion surface 106 of a solar cell module or the like by an adhesive member 105. The corner between the bottom surface 102 and the side surface 103 of the box member 101 forms a curved portion 104 of a curved shape, which is convex on the side of the surface 106, such that the adhesive member 105 remains between the surface 106 and the curved portion 104.

There is no specific limitation on the shape of the curved portion 104, but the curved portion 104 is preferably of the curved shape convex on the side of the surface 106. The radius of curvature of the curved portion 104 is preferably from 0.5 mm to 2.0 mm. The internal angle θ of the outer surface formed between the side surface 103 and the bottom surface 102 is preferably in a range of 90° to 135°.

The thickness of the adhesive member 105 is preferably equal to the radius of curvature of the curved portion 104 so that a sufficient amount of the adhesive member 105 can remain between the adhesion surface 106 and the curved portion 104 to increase the adhesion area.

Figure 2:
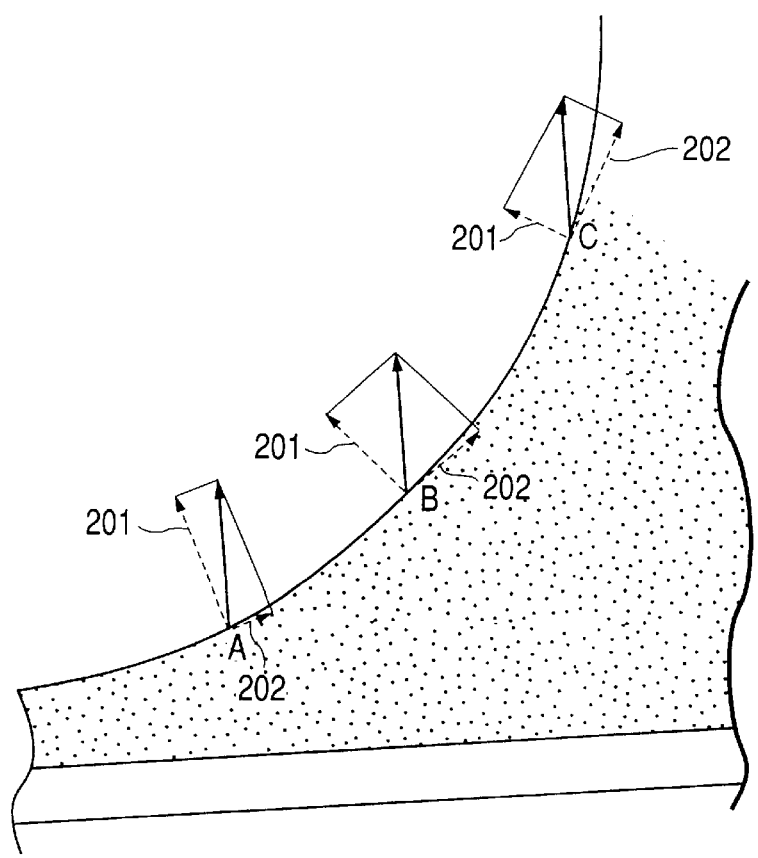
FIG. 2 is a conceptual diagram for showing a stress acting to the interface between the box member and the adhesive member.

FIG. 2 is a conceptual diagram for showing a stress acting to the interface between the box member and the adhesive member in the adhesion structure of the present invention.

As shown in FIG. 2, when a peeling force is exerted in a direction perpendicular to the adhesion surface, the peeling force acting on the curved portion is decomposed into a peeling component 201 along the normal direction and a shearing component 202 along the tangent direction at each point of action in the interface between the box member and the adhesive member. Therefore, the peeling force will not result in peeling at the interface between the box member and the adhesive member, so that the adhesive strength is so strong as to endure before cohesive failure of the adhesive.

Figure 3:
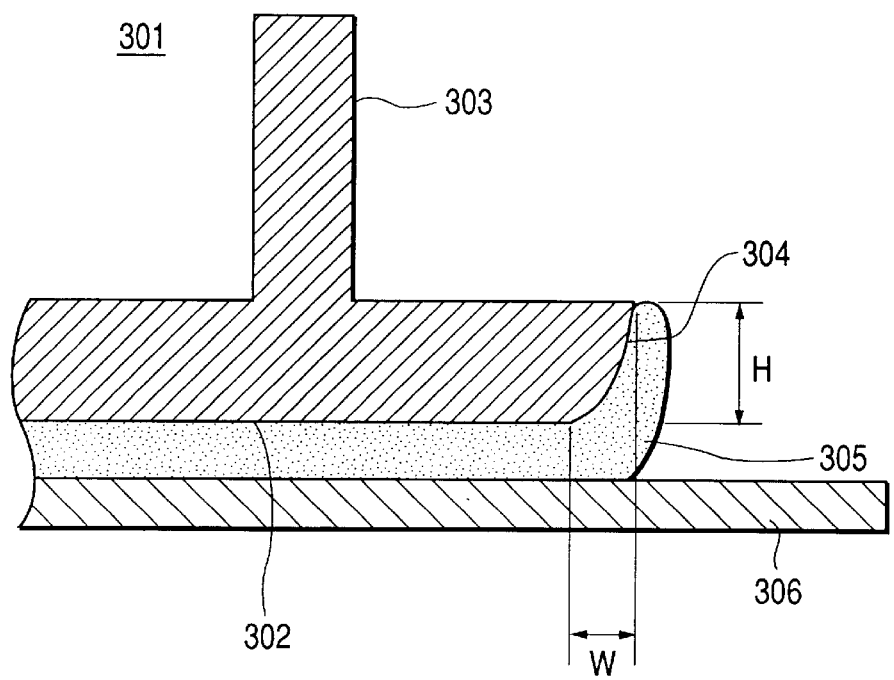
FIG. 3 is a cross-sectional view for showing another example of the adhesion structure according to the present invention.

FIG. 3 is a cross-sectional view for showing another example of the adhesion structure according to the present invention.

In FIG. 3, reference numeral 301 designates a box member, e.g. a terminal box, which adheres to the adhesion surface 306 of a solar cell module or the like with an adhesive member 305. In this example, the bottom surface 302 of the box member 301 has a brim shape projected from the outer surface of the side surface 303 of the box member. The bottom surface 302 has a curved portion 304 of a curved shape convex toward the side of the surface 306, on the side of the edge of the bottom surface 302 contacting with the adhesion surface 306, such that the adhesive member 305 remains between the adhesion surface 306 and the curved portion 304.

There is no specific limitation on the shape of the curved portion 304, but the curved portion 304 is preferably of the curved shape formed on the side of the edge of the bottom surface 302 contacting with the adhesion surface 306 and being convex on the side of the surface 306. The radius of curvature of the curved portion 304 is preferably in a range of 0.5 mm to 2.0 mm.

The thickness of the adhesive member 305 is preferably equal to the radius of curvature of the curved portion 304 such that a sufficient amount of the adhesive member 305 may remain between the adhesion surface 306 and the curved portion 304 to increase the adhesion area.

Figure 4:
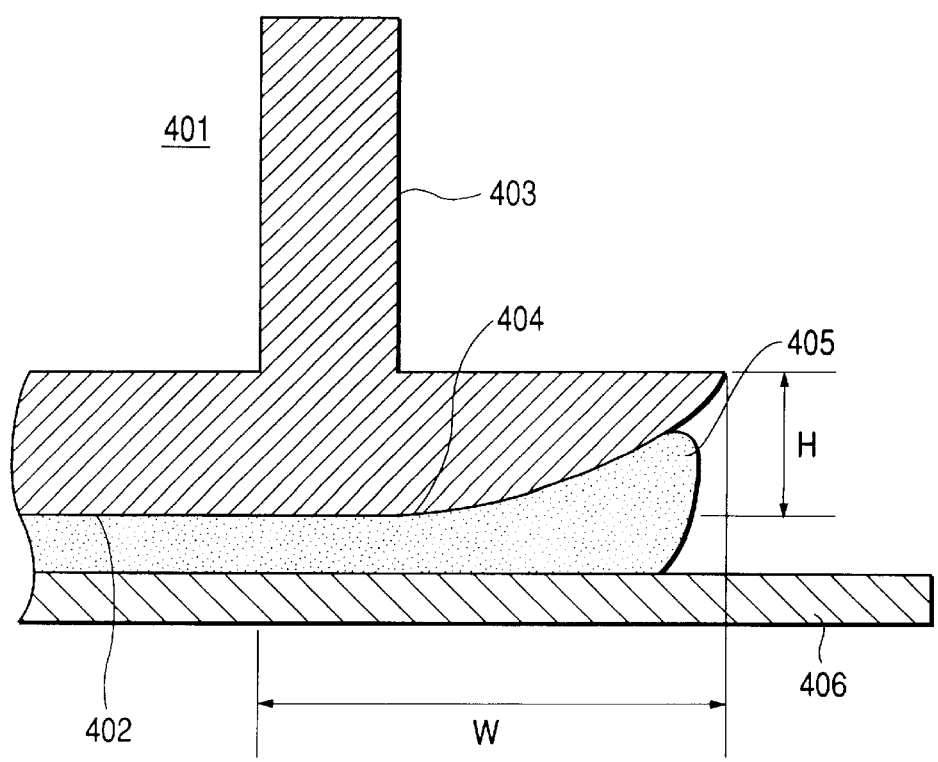
FIG. 4 is a cross-sectional view for showing another example of the adhesion structure according to the present invention.

Further, the width W of curve of the curved portion 304 is smaller than the thickness H of the bottom 302 in the example of FIG. 3, but the width W of curve of the curved portion 404 may be larger than the thickness H of the bottom 402 as shown in FIG. 4.

When the box member of the present invention is a terminal box for a solar cell module, it is required that the terminal box be excellent in heat resistance, humidity resistance, water resistance, electrical insulation, cold resistance, oil resistance, weather resistance, and mechanical strength. The terminal box is preferably made of a material having good adhesion to the adhesive member.

In view of the above factors, the terminal box is preferably made of a plastic material. When flame retardance is taken into account, the terminal box is preferably made of a material selected from flame-retardant plastics and ceramics.

Examples of the plastics include resins and engineering plastics such as polycarbonate, polyamide, polyacetal, modified PPO (PPE), polyester, polyarylate, unsaturated polyester, phenol resin, epoxy resin, polybutylene terephthalate, and nylon. The material for the terminal box may also be selected from the thermoplastic resins such as ABS resin, PP, or PVC.

It is preferred to use carbon black as pigment in order to enhance ultraviolet resistance, or to coat the surface with a resin paint that absorbs the ultraviolet light.

There is no specific limitation on the adhesive member used in the present invention, and the adhesive member can be selected from adhesives, adhesive double-coated tapes, and so on. When an adhesive double-coated tape is used, it is preferable to preliminarily adhere the double-coated tape on the bottom surface of the box member.

There is no specific limitation on the adhesive used in the present invention, but it is preferably selected from epoxy resin based adhesives and silicone based adhesives having high electrical insulation, more preferably from the silicone based adhesives in view of flexibility.

Further, when operability is taken into consideration, the adhesive is preferably one having a short curing time and having a viscosity of not less than 300 p so as to prevent the adhesive from flowing away from the adhesion surface of the box member because of too low viscosity.

When the adhesive is silicone one-part type RTV rubber, the curing method is preferably of the deacetonization type or the dealcoholization type in order to protect electrodes from corrosion.

Specific examples of the epoxy resin based adhesives are those obtained by mixing either of epoxy resin based adhesives available from Three Bond Co., Ltd., "2001", "2002H", "2003", "2016B", "2022" and so on, with either of curing agents also available from Three Bond Co., Ltd., "2102B", "2103", "2104", "2105F", "2105C", "2106", "2131B", "2131D", "2131F", "2163" and so on, at a predetermined ratio.

Further examples include epoxy resins available from Sumitomo 3M Ltd., trade names "EW-2" (one-part type), "S/W-2214" (one-part type), "XA7416" (one-part type), "JA7437" (one-part type), "1838B/A" (two-part type; mixture ratio of the main agent and the curing agent=4:5), "S/W-2216B/A", "DP-100" (1:1), "DP-110" (1:1), "DP-190" (1:1), "DP-PURE60" (1:1), "DP-270" (1:1), and so on.

Examples of the epoxy resins are those available from Yuka Shell Epoxy K. K., the main agent "Epikote" 812, 815, 827, 828, or 834, and the curing agent may be selected as occasion may demand.

Examples of the silicone based adhesives are "1220" and "1230" available from Three Bond Co., Ltd.; "SE9156", "SE9157", "SE9166", "SE9176", "SE9185", "SE9186", "SE9186L", "SE9187" and "SE1811" available from Toray Dow Corning Silicone K. K.; "SILASTIC739RTV", "SILASTIC738RTV", "3140RTV" and "3145RTV"available from Dow Corning K. K.; "KE347", "KE3494", "KE4897", "KE4896" and "KE4895" available from Shin-Etsu Kagaku Kogyo K. K.; "TSE392", "TSE3925", "TSE397", "TSE3971", "TSE3972" and "TSE3975" available from TOSHIBA SILICONE K. K., and so on.

There is no specific limitation on the adhesive double-coated tapes used in the present invention, but preferred tapes are those having some thickness and being excellent in heat resistance, cold resistance, adhesive strength, and durability. The preferred tapes are those excellent in waterproof sealing and those having strong shear adhesion.

Examples of such tapes are VHB adhesive tapes available from Sumitomo 3M Ltd., "Y-4959", "Y-4955", "Y-4950", "Y-4930", "Y-4920", "Y-4914", "Y-4945", "Y-4922", "Y-4952", "Y-4932", "Y-4951", "Y-4931", "Y-4949", "Y-4929", "Y-4910J", "Y-4627", "Y-4630F", "Y- 4609", "Y-4615" and so on.

Further examples of the double-coated tapes are those available from NICHIBAN CO., LTD., "831", "841", "1843", "843-S", "844", "851", "853" and so on.

Still further examples of the double-coated tapes are those available from NITTO DENKO CORP., "No. 541", "No. 554", "No. 5710", "No. 5711", "No. 5713", "No. 575", "No. 370" and so on.

The present invention will be described in detail based on the following Examples, but it should be noted that the present invention is by no means intended to be limited to these Examples.

(EXAMPLE 1)

Figure 5:
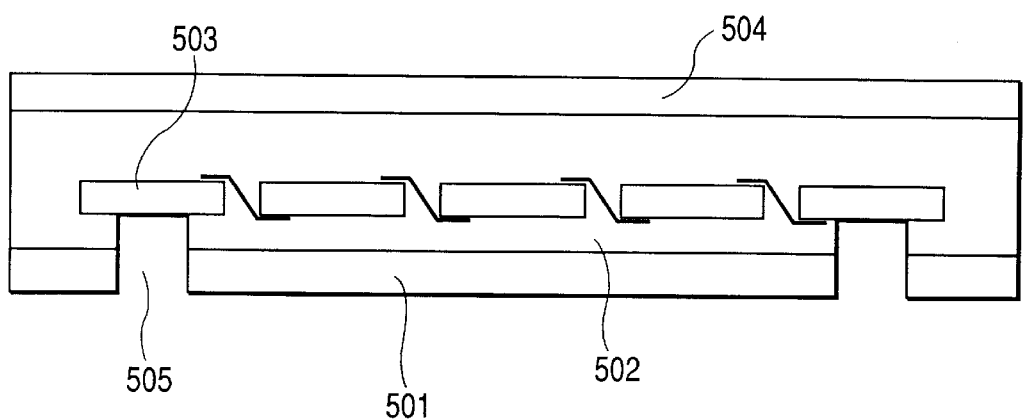
FIG. 5 is a schematic, structural view for showing a solar cell module of Example of the present invention.
Figure 6:
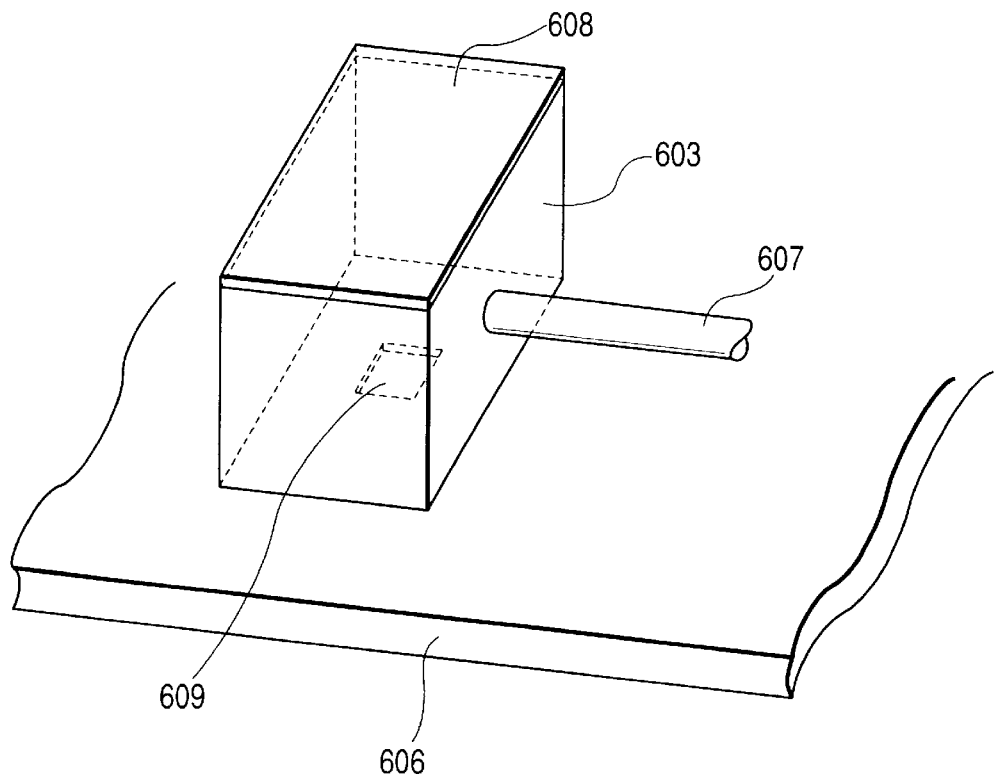
FIG. 6 is a perspective view for showing a terminal box for the solar cell module of Example.

A solar cell module shown in FIG. 5 was produced and terminal boxes shown in FIG. 6 were attached there to.

First, five amorphous solar cell elements 503 were connected in series and copper tabs having an appropriate length, as wires for the positive and negative terminals, were stuck on the back surface of the solar cell elements 503. Solder was put on the tip of the copper tabs to form electrode outlet portions (not shown in the drawings). At this time a glass cloth tape was stuck on the back surface of the copper tabs in order to enhance electrical insulation.

A back surface-reinforcing member 501 was a steel sheet (0.4 mm thick) coated with a polyester resin, a filler 502 was EVA (ethylene-vinyl acetate copolymer of weather-resistant grade), and a weather-resistant film 504 was ETFE (ethylene tetrafluoroethylene). Opening portions 505 having the diameter of φ15 mm were preliminarily formed in the back surface-reinforcing member 501 for the purpose of taking the terminals out through the opening portions.

Finally, the filler 502 around the electrode outlet portions of the solar cell elements 503 was hollowed out by a cutter knife or the like to expose the electrode outlet portions, and the insulating coating of a lead wire HKIV was preliminarily stripped out in the range from the end to approximately 5 mm and the wire was soldered to each electrode outlet portion.

Then, as shown in the cross-sectional view of FIG. 6, the lead wire was set through an opening portion 609 and the bottom surface of the terminal box 601 adhered to the solar cell module with an adhesive (silicone sealant "SILASTIC739" available from Dow Corning). The lead wire was soldered to a cable 607 within the terminal box 601 to make electrical connection between them. Then a lid member 608 of the box was closed and the module was kept still for 72 hours, thereby forming the terminal outgoing portions of the solar cell module.

The adhesion structure of the terminal box 601 with the solar cell module 606 was shown in FIG. 1, in which the internal angle θ between the bottom surface 102 and the outer surface of the side surface 103 was 120°, the radius of curvature of the curved portion 104 was 1 mm, and the thickness of coating of the adhesive (adhesive member 105) was 1 mm.

Figure 7:
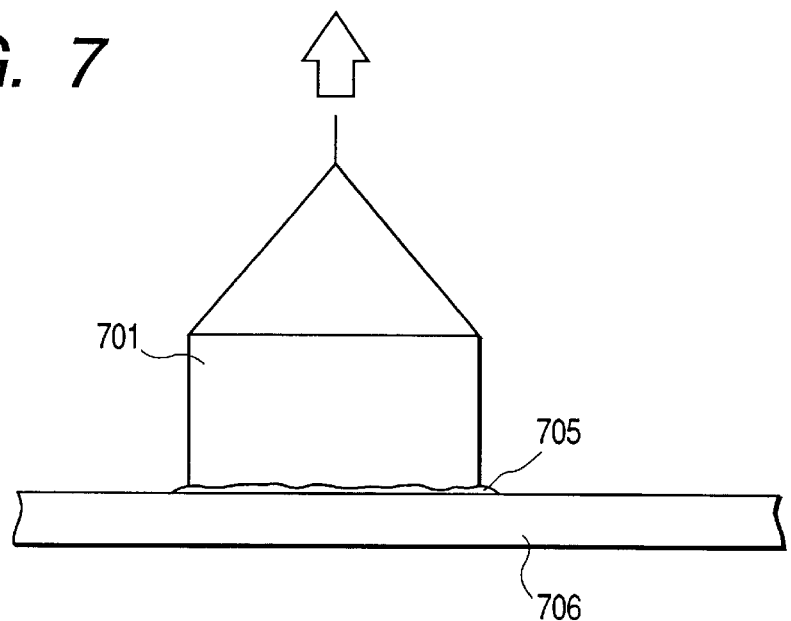
FIG. 7 is a schematic view for showing a 90° peeling test in Example.

The adhesive strength of the terminal box in the 90° peeling direction was measured as shown in FIG. 7. The result is shown in Table 1.

(Comparative Example 1)

Figure 8:
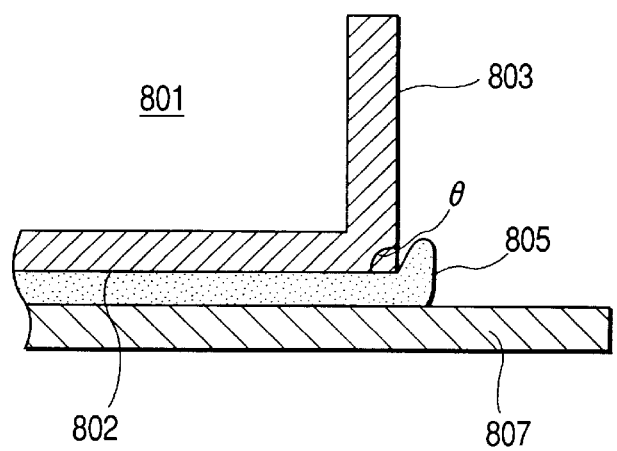
FIG. 8 is a cross-sectional view for showing the adhesion structure of Comparative Example 1.

As shown in FIG. 8, the adhesion structure was made in the same manner as in Example 1 except that the terminal box as the box member 801 had no curved portion and the internal angle θ of the external surface between the bottom surface 802 and the side surface 803 was 90°. The adhesive strength of the terminal box in the 90° peeling direction was measured. The result is shown in Table 1.

TABLE 1

| Sample | Adhesion strength in 90° peeling (kgf) | Peeling state | Increase percent of strength against Comp. Ex. (%) |
|---|---|---|---|
| Comp. Ex. 1 | 10.4 | Interfacial peeling | — |

TABLE 1-continued

| Sample | Adhesion strength in 90° peeling (kgf) | Peeling state | Increase percent of strength against Comp. Ex. (%) |
|---|---|---|---|
| Ex. 1 | 12.7 | Cohesive failure of silicone adhesive | 22.1 |

It is seen that the adhesion structure of the present invention can scatter a peeling force for peeling the terminal box away from the solar cell module and thus can increase the adhesive strength.

(EXAMPLE 2)

As shown in FIG. 3, the adhesion structure was produced in the same manner as in Example 1 except that the terminal box as the box member 301 had the bottom surface 302 of the brim shape and the radius of curvature of the curved portion 304 was 1 mm. The adhesive strength of the terminal box in the 90° peeling direction was measured. The result is shown in Table 2.

(Comparative Example 2)

Figure 9:
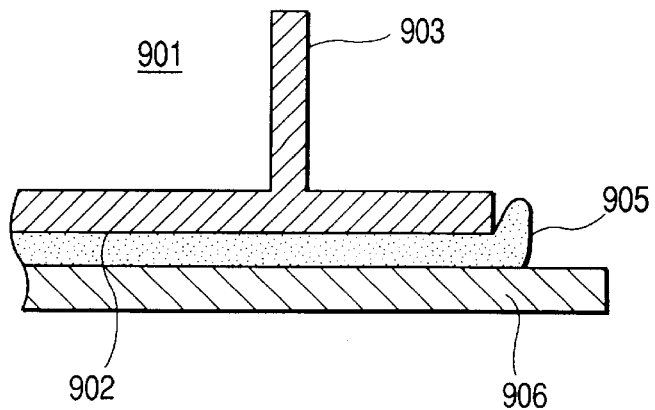
FIG. 9 is a cross-sectional view for showing the adhesion structure of Comparative Example 2.

As shown in FIG. 9, the adhesion structure was produced in the same manner as in Example 1 except that the terminal box as the box member 901 had the bottom surface 902 of the brim shape but had no curved portion and the edge of the bottom surface stood at the angle of 85°. The adhesive strength of the terminal box in the 90° peeling direction was measured. The result is shown in Table 2.

TABLE 2

| Sample | Adhesion strength in 90° peeling (kgf) | Peeling state | Increase percent of strength against Com. Ex. (%) |
|---|---|---|---|
| Comp. Ex. 2 | 10.1 | Interfacial peeling | — |
| Ex. 2 | 12.8 | Cohesive failure of silicone adhesive | 26.7 |

It is seen that the adhesion structure of the present invention can scatter a peeling force for peeling the terminal box away from the solar cell module and thus can increase the adhesive strength.

When the box member, particularly the terminal box for a solar cell module, is formed in the adhesion structure of the present invention, the structure can scatter the peeling force that acts so as to separate the terminal box away from the solar cell module, and therefore the adhesive strength of the terminal box with respect to the adhesive is increased and the durability of solar cell module is enhanced.

What is claimed is:

1. An adhesion structure of a box member wherein the box member adheres to an adhesion surface with an adhesive member, wherein a corner between a bottom surface and a side surface of the box member has a curved portion of a curved shape, and wherein the adhesive member remains between the adhesion surface and the curved portion such that a thickness of the adhesive member increases outward.

2. An adhesion structure of a box member wherein the box member adheres to an adhesion surface with an adhesive member, wherein a bottom surface of the box member has a brim-like shape projected from an external surface of a side surface of the box member and wherein an edge of the bottom surface has a curved portion of a curved shape such that the adhesive member remains between the adhesion surface and the curved portion such that a thickness of the adhesive member increases outward.

3. The adhesion structure of the box member according to claim 1, wherein the curved portion has a curved shape convex on a side of the adhesion surface.

4. The adhesion structure of the box member according to claim 1, wherein an internal angle θ of an external surface between the side surface and the bottom surface is in a range of 90° to 135°.

5. The adhesion structure of the box member according to claim 2, wherein the curved portion has a curved shape formed at an end of the bottom surface on a side contacting with the adhesion surface, the curved shape being convex on a side of the adhesion surface.

6. The adhesion structure of the box member according to claim 1 or 2, wherein a radius of curvature of the curved portion is in a range of 0.5 mm to 2.0 mm.

7. The adhesion structure of the box member according to claim 1 or 2, wherein a thickness of the adhesive member is equal to a radius of curvature of the curved portion.

8. The adhesion structure of the box member according to claim 1 or 2, wherein the adhesive member comprises an adhesive double-coated tape.

9. The adhesion structure of the box member according to claim 8, wherein the adhesive double-coated tape preliminarily adheres to the bottom surface of the box member.

10. The adhesion structure of the box member according to claim 1 or 2, wherein the adhesive member is a silicone based adhesive.

11. The adhesion structure of the box member according to claim 10, wherein a viscosity of the silicone based adhesive is not less than 300 poise (P).

12. The adhesion structure of the box member according to claim 1 or 2, wherein the bottom surface of the box member has a surface in contact with the adhesion surface.

13. The adhesion structure of the box member according to claim 1 or 2, wherein the box member is a terminal box having therein an electrical connection part between a solar cell element and an external lead wire, and wherein the adhesion surface is a surface of a solar cell module.

14. A solar cell module comprising a terminal box fixed to an adhesion surface with an adhesive member, wherein a corner between a bottom surface and a side surface of the terminal box has a curved portion of a curved shape, and wherein the adhesive member remains between the adhesion surface and the curved portion, such that a thickness of the adhesive member increases outward.

15. A solar cell module comprising a terminal box fixed to an adhesion surface with an adhesive member, wherein a bottom surface of the terminal box has a brim-shaped portion projected from an external surface of a side surface, an end of the projected portion of the bottom surface having a curved portion of a curved shape, and wherein the adhesive member remains between the adhesion surface and the curved portion, such that a thickness of the adhesive member increases outward.

16. The adhesion structure of the box member according to claim 1, wherein a viscosity of the adhesive member is not less than 300 poise (P).

* * * * *

UNITED STATES PATENT AND TRADEMARK OFFICE
CERTIFICATE OF CORRECTION

PATENT NO. : 6,207,896 B1
DATED : March 27, 2001
INVENTOR(S) : Fumitaka Toyomura It is certified that error appears in the above-identified patent and that said Letters Patent is hereby corrected as shown below:

Column 1,
Line 50, "a larger" should read -- greater --.

Column 2,
Line 24, "Example" should read -- an example --.
Line 26, "Example;" should read -- the example; --.

Column 5,
Line 2, "there to." should read -- thereto. --.

Signed and Sealed this

Twenty-ninth Day of January, 2002

Attest:

*Attesting Officer*

JAMES E. ROGAN
*Director of the United States Patent and Trademark Office*